US008601268B2

(12) United States Patent
Judell

(10) Patent No.: US 8,601,268 B2
(45) Date of Patent: Dec. 3, 2013

(54) METHODS FOR SECURING TRANSACTIONS BY APPLYING CRYTOGRAPHIC METHODS TO ASSURE MUTUAL IDENTITY

(75) Inventor: Neil Judell, Cambridge, MA (US)

(73) Assignee: ID Security, LLC, Manchester, MA (US)

( * ) Notice: Subject to any disclaimer, the term of this patent is extended or adjusted under 35 U.S.C. 154(b) by 160 days.

(21) Appl. No.: 13/050,474

(22) Filed: Mar. 17, 2011

(65) Prior Publication Data

US 2012/0239928 A1    Sep. 20, 2012

(51) Int. Cl.
*H04L 9/32* (2006.01)

(52) U.S. Cl.
USPC ........... 713/169; 713/168; 713/171; 713/184; 713/189; 713/193; 370/352; 370/338; 380/282; 705/64; 726/4; 726/7; 726/15

(58) Field of Classification Search
USPC ....................................................... 713/168
See application file for complete search history.

(56) References Cited

U.S. PATENT DOCUMENTS

| | | | |
|---|---|---|---|
| 6,311,218 B1 * | 10/2001 | Jain et al. ...................... | 709/229 |
| 7,093,129 B1 * | 8/2006 | Gavagni et al. ............... | 713/175 |
| 7,305,561 B2 * | 12/2007 | Hunt et al. .................... | 713/182 |
| 7,635,084 B2 | 12/2009 | Wang et al. | |
| 2003/0055738 A1 * | 3/2003 | Alie ................................ | 705/26 |
| 2005/0131834 A1 * | 6/2005 | Rodriguez et al. .............. | 705/64 |
| 2006/0190724 A1 * | 8/2006 | Adams et al. ................. | 713/166 |
| 2008/0034216 A1 * | 2/2008 | Law ............................. | 713/183 |
| 2010/0332832 A1 | 12/2010 | Wu et al. | |
| 2011/0004557 A1 | 1/2011 | Wang et al. | |
| 2011/0055761 A1 | 3/2011 | Williamson | |
| 2011/0060688 A1 | 3/2011 | Fernandez Gutierrez | |
| 2011/0276495 A1 * | 11/2011 | Varadarajan et al. ........... | 705/71 |

* cited by examiner

*Primary Examiner* — Nathan Flynn
*Assistant Examiner* — Brian Wright
(74) *Attorney, Agent, or Firm* — Schmeiser, Olsen & Watts, LPP; Timothy P. Collins

(57) ABSTRACT

Described are a system and method for securing an online transaction. A request is output from an electronic device to a verification server to perform an online transaction. The verification server generates a challenge request. The challenge request is encrypted with a private key of a pair of cryptographic keys. The encrypted challenge request is decrypted with a public key of the pair of cryptographic keys. The decrypted challenge request and the challenge request generated by the verification server are compared. A verification result is generated in response to the comparison.

6 Claims, 14 Drawing Sheets

METHODS FOR SECURING TRANSACTIONS BY APPLYING CRYTOGRAPHIC METHODS TO ASSURE MUTUAL IDENTITY

FIELD OF THE INVENTION

The invention relates generally to the field of online security, and more particularly, to systems and methods for securing online transactions.

BACKGROUND

Public electronic information networks such as the Internet provide a global communications infrastructure so that users can communicate with each other by email, text messaging, and the like, or to engage in electronic commerce, referred to as e-commerce. A typical example of an e-commerce transaction includes online shopping, where a computer user purchases an item from a merchant's website.

A well-known problem with the Internet is that online users expose themselves to risk with regard to personal or sensitive information being accessed, intercepted, or spoofed by an unauthorized party. A prevalent example pertains to point-of-sales transactions, where sensitive information such as a credit card and the like can be unlawfully obtained when an online shopper transmits the information as electronic data over the Internet to an online merchant. In a related example, a bank customer's ATM personal identification number (PIN) can be unlawfully obtained during a financial transaction over the Internet. In yet another example, a member of a social network service such as Facebook, Twitter, Linkedin, and the like may transmit personal information such as a phone number or home address over the Internet to another member, which can likewise be exposed to unauthorized parties. In these examples, personal or sensitive information is transmitted over a network, exposing online users to interception by a computer hacker, where the information can be obtained for unlawful purposes, such as fraud or identity theft.

In an effort to improve security, an online user will often create a username and password combination for each e-commerce website or online service with which the user wants to engage in activity. However, it can be difficult for the online user to maintain a large listing of different usernames and passwords. Moreover, the usernames and passwords, when transmitted over a public network, are exposed to unauthorized parties via network sniffer attacks and the like.

BRIEF SUMMARY

An embodiment features a computer-implemented method for securing an online transaction. A request is output from an electronic device to a verification server to perform an online transaction. A challenge request is generated from the verification server. The challenge request is encrypted from the electronic device with a private key of a pair of cryptographic keys. The encrypted challenge request is decrypted with a public key of the pair of cryptographic keys. The decrypted challenge request and the challenge request generated by the verification server are compared. A verification result is generated by the verification server in response to the comparison.

Another embodiment features a computer-implemented method for securing an online transaction between an electronic device and a verification server. A key pair is generated that includes a private key and a public key. An electronic device is configured to include the private key. A verification server is configured to include the public key. An online transaction is initiated from the electronic device an online transaction. A transaction authorization request is generated from the electronic device. A challenge request is generated from the verification server in response to the transaction authorization request. The challenge request is encrypted with the private key. The encrypted challenge request is decrypted with the public key. The decrypted challenge request and the challenge request generated by the verification server are compared to produce an verification result. The verification result is output from the verification server to the electronic device.

Another embodiment features a computer-implemented method for securing an online transaction. A request is generated from an electronic device to perform an online transaction. A challenge request is generated from an online security server in response to the request. The challenge request is encrypted with a user private key stored in the electronic device. The encrypted challenge request is output to the online security server. The encrypted challenge request is decrypted with a public key corresponding to the private key. The online security server compares the decrypted challenge request and the challenge request generated by the online security server. User information is encrypted with an authorizer public key in response to the comparison. The user information is decrypted by an authorizing party with an authorizer private key. A result is output from the authorizing party.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENTS

Figure 1:
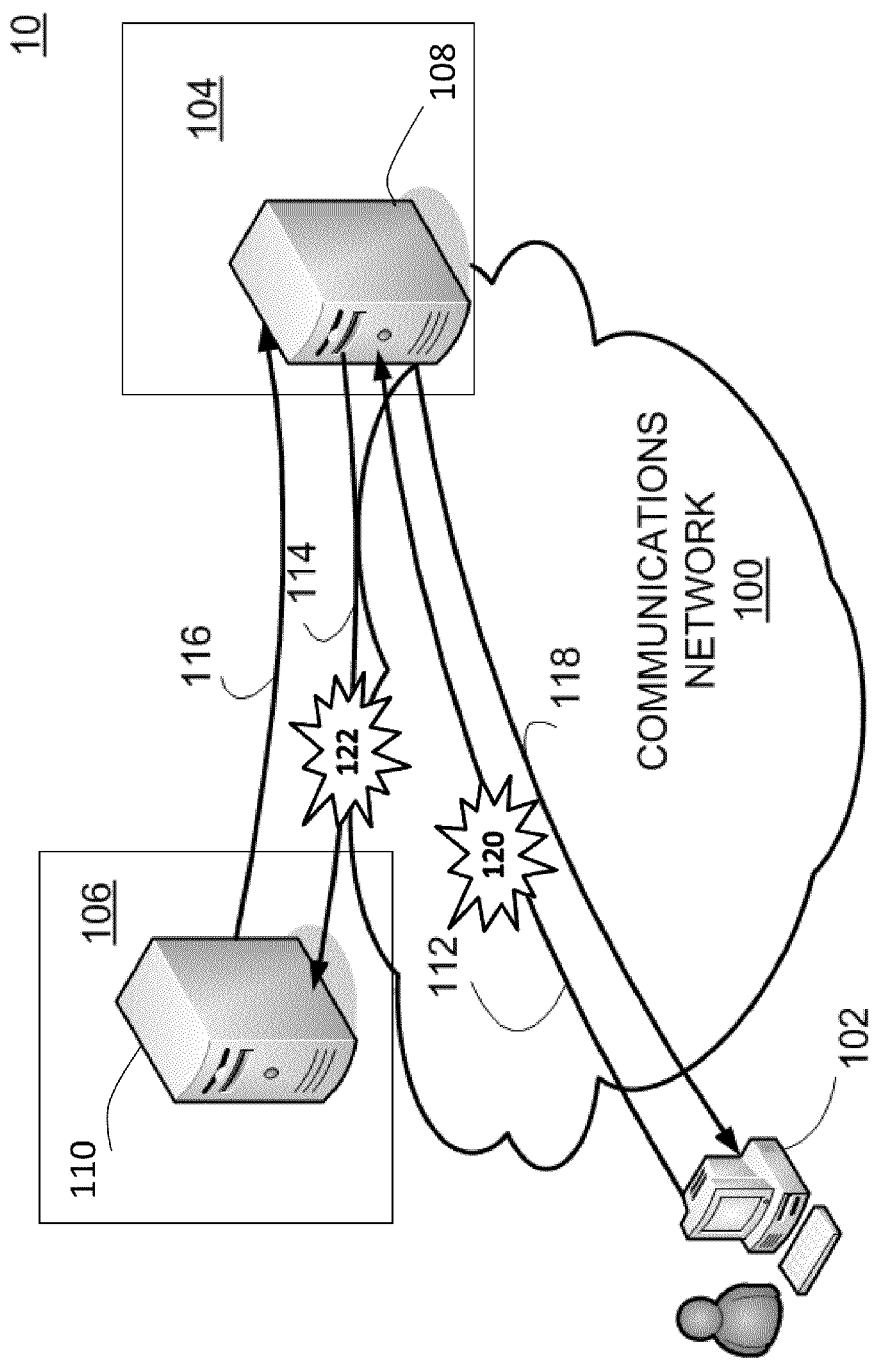
FIG. 1 is a schematic network diagram illustrating e-commerce information flow paths between a user computer, an online merchant, and an authorizing party.

Before embodiments of the present invention are disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom circuits, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Each block of the flowchart illustrations and/or block diagrams described herein, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A storage device, also referred to as a storage repository, can include a computer readable storage medium, which may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable medium can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the inventive concepts.

FIG. 1 is a schematic network diagram illustrating a network environment 10 including e-commerce information flow paths 112, 114, 116, 118 between a user computer 102, an online merchant 104, also referred to as a vendor, and an authorizing party 106, for example, a credit card issuer. A buyer with access to the user computer 102 can purchase items from the online merchant 104. The online merchant 104 has an e-commerce server 108 that can deliver content to the user computer 102, for example, purchase information, online menus, checkout information, or other information related to an e-commerce transaction. The authorizing party 106 has an verification server 110, which validates credit card information presented by the buyer, compares the requested purchase value of the ordered item against available credit, and either authorizes the transaction or denies the transaction. The user computer 102, the e-commerce server 108, and the verification server 110 exchange electronic information with each other via a communications network 100, for example, a public electronic information network such as the Internet.

During an e-commerce transaction, an online purchase request 112 is placed from the user computer 102 to the e-commerce server 108. For example, the buyer at the user computer 102 can select an item of interest from the merchant's retail website, and order the item during an online checkout process. In order to complete the checkout process, the buyer registers with the e-commerce server 108, for example, by entering a username and password. The buyer inputs credit card information such as the credit card number, expiration date, card verification value (CVV), telephone number, billing address, etc., and the like to a user interface displayed on the user computer 102. This information is transmitted from the user computer 102 to the e-commerce server 108 along an information flow path 112.

After the buyer at the user computer 102 orders the item, the online merchant 104 sends an authorization request 114 to the authorizing party 106. For example, the online merchant 104 can send the authorization request from the e-commerce server 108 along an information flow path 114 to the verification server 110, which validates the credit card information, checks the purchased amount of the ordered item against available credit, etc. The verification server 110 can authenticate and/or authorize the authorization request, or the verification server 110 can deny the authorization request. The verification server 110 generates a corresponding authorization response which is provided to the online merchant 104 along information flow path 116, which in turn can send a notification along information flow path 118 to the user computer 102, informing the buyer that the purchase request is authorized or denied.

During the e-commerce transaction, sensitive information such as the buyer credit card number is exchanged over information flow paths 112-118 between the computer user 102, the e-commerce server 108, and the verification server 110. However, this information can be exposed to network sniffers and the like during transmission. Thus, a computer hacker or other unauthorized party can illicitly obtain this information during transmission at various locations between the computer user 102, the online merchant 104, and the authorizing party 106, such as location 120 along information flow path 112 or location 122 along information flow path 114. Similar risks occur in other electronic communications, for example, between a computer user and a social network service website, where personal information such as the user's home address, phone number, account password, etc. may be vulnerable to interception by a hacker or other unauthorized party.

Well-known security methods are available involving encryption and authentication to improve transmission security. For example, credit card information and other sensitive information can be transmitted to a secure server and encrypted, requiring a recipient to decipher the transmitted data in order to determine its contents. However, the credit card information, even in encrypted form, is nevertheless transmitted over the communications network 100, and is thus vulnerable to interception and deciphering by an unauthorized party such as a hacker. Moreover, the secure server itself can be vulnerable to access by a hacker, who may acquire the decryption key for decrypting the sensitive information, or obtain sensitive information stored on the server.

The systems and methods in accordance with embodiments of the present inventive concepts include online transactions performed in a secure manner by limiting or eliminating the transmission of sensitive or private information transmitted electronically over a public network. Even when sensitive information is transmitted, an extensive authentication and authorization process is performed to ensure transmission security.

In an embodiment, the systems and methods include a key pair comprising a private key and a public key. The private key is encrypted with a password, also referred to as a key passphrase or an encryption key, which is known to the requestor of the online transaction. The public key can be transmitted to any party responsible for authorizing the online transaction, for example, a credit card issuer. The authorizing party uses the public key to decrypt transmitted data encrypted by the private key. Alternatively, the public key can be used to encrypt data that can only be decrypted by the private key. The private key and the password remain on the user computer 102 or an electronic device in communication with the user computer 102 such as a USB flash memory device during the online transaction, with no need for either the private key or the password to be transmitted via a public network to an online merchant, credit card issuer, or other authorizing party during authentication or authorization of the user. Even if the private key is acquired by an unauthorized user, for example, if the user's computer is stolen, the private key is ineffective for accessing personal information since the password is also required, i.e., to decrypt the private key. Thus, a user must be in possession of the personal information, the private key, and the password in order to perform an online transaction.

In another embodiment, an online security server is positioned between a user electronic device such as a personal computer, smartphone, etc., and an authorizing party such as a credit card issuer, to ensure that an extensive authentication process is performed prior to the transmission of encrypted sensitive information, and that two key pairs are provided to encrypt and decrypt the sensitive information. The first key pair includes a user public key and a user public key, similar to the key pair described in the abovementioned embodiment. The second key pair includes an authorizer public key and an authorizer private key. Sensitive user information can be stored at a secure location with no transmission during an operation, or can be transmitted in encrypted form to an authorizing party only after an authentication process is performed requiring both key pairs. Accordingly, sensitive information is prohibited from being transmitted in cleartext form along a transmission path between the user and the authorizing party.

Figure 2:
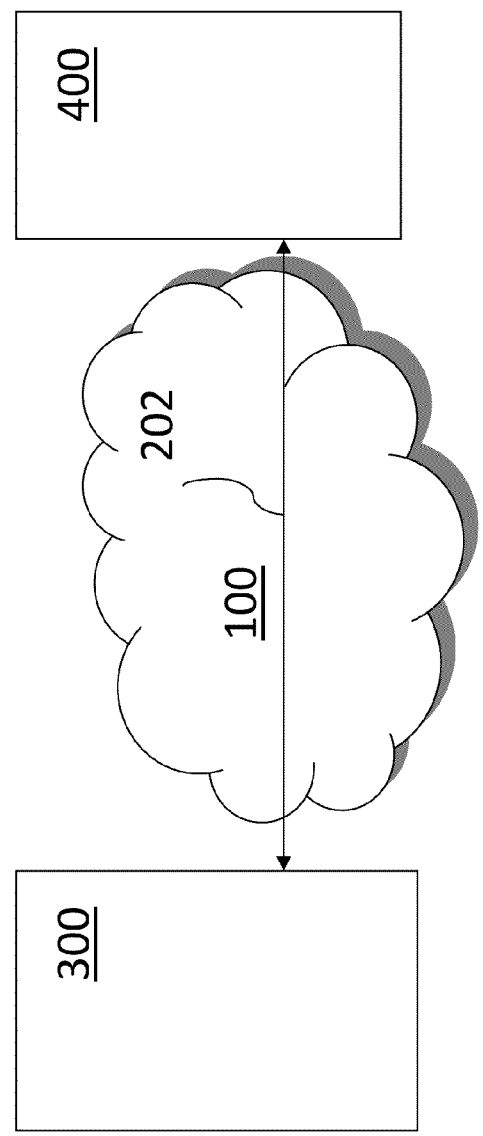
FIG. 2 is a schematic network diagram illustrating an information security system and a verification server in an online transaction, in accordance with an embodiment.

FIG. 2 is a schematic network diagram illustrating a network environment 20 in which an information security system 300 and a verification server 400 engage in an online transaction, in accordance with an embodiment. The information security system 300 is shown and described in detail in FIG. 3. The verification server 400 is shown and described in detail in FIG. 4. Some or all of the network environment 20 can complement or coexist with the network environment 10 shown and described in FIG. 1. For example, the information security system 300 and/or the verification server 400 can be configured to operate in the network environment 10 shown in FIG. 1, wherein the user computer 102 includes the information security system 300 or otherwise communicates with the information security system 300, and the verification server 400 is in communication with the e-commerce server 108.

Example implementations of the information security system 300 include, but are not limited to, a desktop computer, laptop computer, tablet computer, handheld computer, mobile device such as a smartphone, or other electronic device, or a memory device or other electronic device, for example, a USB flash memory device. Example implementations of the verification server 400 include, but are not limited to, a desktop computer, laptop computer, or server system.

The information security system 300 and the verification server 400 can exchange electronic information with each other via the communications network 100, for example, a public electronic information network such as the Internet.

The information security system 300 and the verification server 400 can exchange electronic information with one or more intermediary electronic devices via the communications network 100. For example, the verification server 400 can communicate with a payment processor or portal, the verification server 110 described in FIG. 1, or a social network web server during an online transaction. In another example, the information security system 300 can communicate with an e-commerce server, for example, the e-commerce server 108 described in FIG. 1.

Accordingly, the information security system 300 and the verification server 400 can be in direct or indirect electronic communication with each other through a communications network 100 such as the Internet via one or more local area network (LAN) or wide area network (WAN) connections. One or more information flow paths 202 can be established through the communications network 100 between the information security system 300 and the verification server 400. One or more intermediary electronic devices, such as a payment processor, e-commerce server, and the like, can be positioned along the information flow paths 202 between the information security system 300 and the verification server 400, and can exchange electronic information to/or from the information flow paths 202.

In accordance with embodiments of the present inventive concepts, an authorization request is sent during an online transaction in a bidirectional information flow path 202 from the information security system 300 to the verification server 400 in communication with an authorizing party. The authorizing party can be a credit card issuer, a debit card issuer, a bank, a card association, or other entity responsible for authorizing a transaction initiated from the information security system 300. Unlike the information flow paths 112-118 shown and described in FIG. 1, the authorization request in the information flow path 202 does not require a password or other personal or sensitive information. Thus, an unauthorized party cannot intercept such information during the online transaction for purposes of spoofing and the like. Instead, electronic information transmitted with the authorization request from the information security system 300 can include a username and an easy-to-remember authorizing issuer identification (ID), for example, a credit card identification "Visa," which is highly generic and can be provided to associate the authorizing party with the user.

In response, the verification server 400 sends a challenge request to the information security system 300 via the information flow path 202. The information security system 300 presents via a user interface or other display with a request that the user enter a password in response to the challenge request, for example, shown in FIG. 14. When the appropriate password is entered, the challenge request is encrypted with a private key that can only be decrypted by a corresponding public key located on the verification server 400. The encrypted challenge request is sent to the verification server 400, where it is decrypted using the public key and compared with the original challenge request generated by the verification server 400. If the comparison produces a match, then the authorization request is approved; otherwise, the authorization request is denied.

Accordingly, the systems and methods in accordance with embodiments comply with several well-known tenets of information security established according to government guidelines. A first tenet provides that a user can be authenticated according to "something you know," for example, a password or PIN, or according to "something you have," for example, an ATM card or smart card." A second tenet pertains to secure encryption, for example, using a public key and a public key for encrypting and decrypting a message. A third tenet pertains to a challenge-response authentication, in which one party presents a question, referred to as a challenge, and another party must provide a valid answer, referred to as a response, to be authenticated. The systems and methods described herein ensure that the "something you have" and "something you know" items are secure, for example, by eliminating a requirement that such items are not transmitted across a communications network 100, and/or by encrypting the items in the event that the items are transmitted.

Further, a single username and password can apply to multiple credit cards, ATM cards, smart cards, library cards, and the like with a single easy-to-remember authorizing issuer ID, for example, a credit card ID "Visa." Moreover, sensitive financial information or personal information is not sent to a vendor, credit card issuer, or other authorizing party during an exchange of electronic information, for example, in an online transaction. An online merchant as part of an online transaction likewise benefits from these features because the online merchant can be assured of the user's identity. Moreover, the online merchant does not receive sensitive financial information and is therefore not exposed to a risk of theft of such information, and subsequent consequences such as lawsuits, etc. Credit card information is sent once to the credit card issuer, so there is a reduced risk of credit card information being stolen, even when used frequently for e-commerce transactions. Thus, online merchants do not require complicated security mechanisms for securing an online transaction. Even if an unauthorized party intercepts data exchanged between the verification server and the information security system 300, the acquired data provides no ability for the unauthorized user to gain access to personal or sensitive information during the online transaction, or to decrypt this information.

Figure 3:
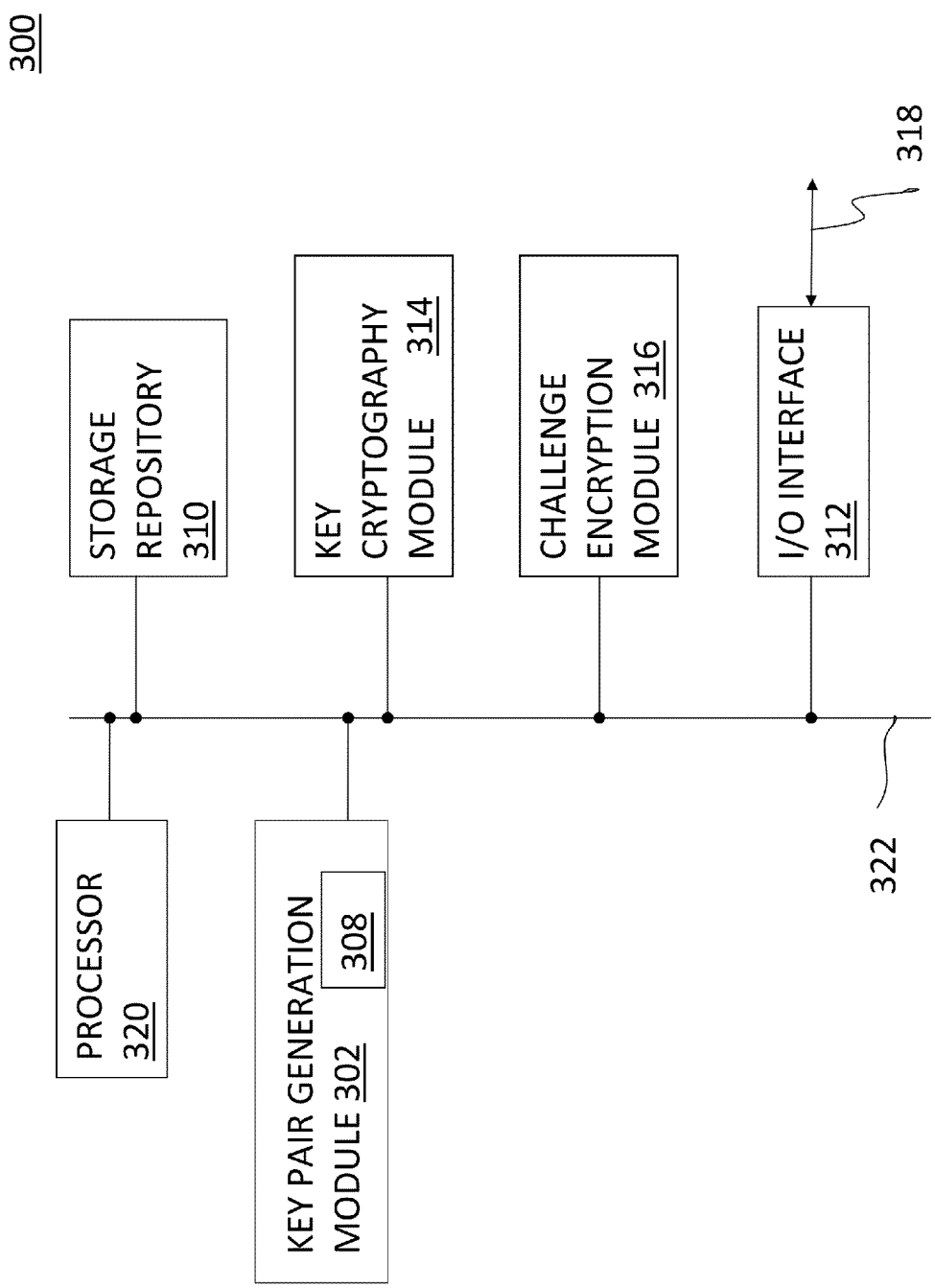
FIG. 3 is a block diagram of the information security system shown in FIG. 2, in accordance with an embodiment.

FIG. 3 is a block diagram of the information security system 300 shown in FIG. 2, in accordance with an embodiment. Elements of the information security system 300 can be downloaded to a user computer as part of an installation program provided from a remote location, for example, stored on a computer server at an authorizing party. The installation program can include a purchasing application or other software applications applicable to an online transaction. The information security system 300 can be configured to communicate with the purchasing application or other software applications, whether the information security system 300 and the other applications are co-located on a same hardware platform or are separate from each other. The information security system 300 can execute entirely on a computer, for example, a server, or some elements of the information security system 300, for example, the key pair generation module 302, can execute on a computer, while other elements, for example, the challenge encryption module 316, execute on a remote computer, for example, a server. The information security system 300 can include hardware, software, firmware, or a combination thereof.

The information security system 300 includes a processor 320 in communication with a key pair generation module 302, a storage repository 310, a key cryptography module, 314, a challenge encryption module 316, and an I/O interface 312 over a communications bus 322. A user can communicate with the information security system 300 by way of a connector 318 of the I/O interface 312, for example, using one or more input devices such as a keyboard, mouse, and the like. The connector 318 can include a LAN connection, a WAN connection, or other connection for coupling to the communications network 100.

The key pair generation module 302 generates a key pair for securing information exchanged between transaction participants, for example, between a user at the user computer and the authorizing party 204 shown in FIG. 2. The key pair generation module 302 generates a private key and a public key, respectively. The key pair generation module 302 can provide the private key in a binary format, an image, or other format known to those of ordinary skill in the art. The private key can be a file or other data form that is stored in the storage repository 310, or other storage device in communication with the information security system 300, for example, flash memory.

The public key generation module 306 can produce the public key in an ASCII format, which is output via the I/O interface 212 to an external location such as the verification server 400 described herein. Thus, in a preferred embodiment, the private key remains with the information security system 300, and the public key is output from the information security system 300 to a different location. The key pair generation module 302 can generate the key pair from random or pseudorandom seeds determined from the time of day and/or various events, system clock, random numbers, and/or other random sources.

The key pair generation module 302 includes a passphrase generation module 308 that generates a password, or passphrase, provided by the user for encrypting and/or decrypting the private key. When the key pair generation module 302 generates the key pair, the user can select the password, for example, by entering the password in an application window displayed on a computer monitor or screen.

The key cryptography module 314 encrypts and/or decrypts at least one of the private key and the public key of the key pair according to cryptography techniques known to those of ordinary skill in the art, for example, asymmetric cryptography. In a preferred embodiment, the key cryptography module 314 encrypts the private key with the user-defined password, passphrase, and the like generated by the passphrase generation module 308. The password can be provided to the key cryptography module 314 as an encryption key for encrypting and/or decrypting the private key. The private key is preferably encrypted using the password prior to storage in the storage repository 310. The private key is decrypted prior to use for encrypting a challenge request or other data for output from the information security system 300

The challenge encryption module 316 encrypts the data received via the I/O interface 312. In a preferred embodiment, the challenge encryption module 316 encrypts the challenge request received from the verification server 400. The information security system 300 can include a decryption module (not shown) for decrypting a challenge message or other electronic information received by the information security system 300.

Figure 4:
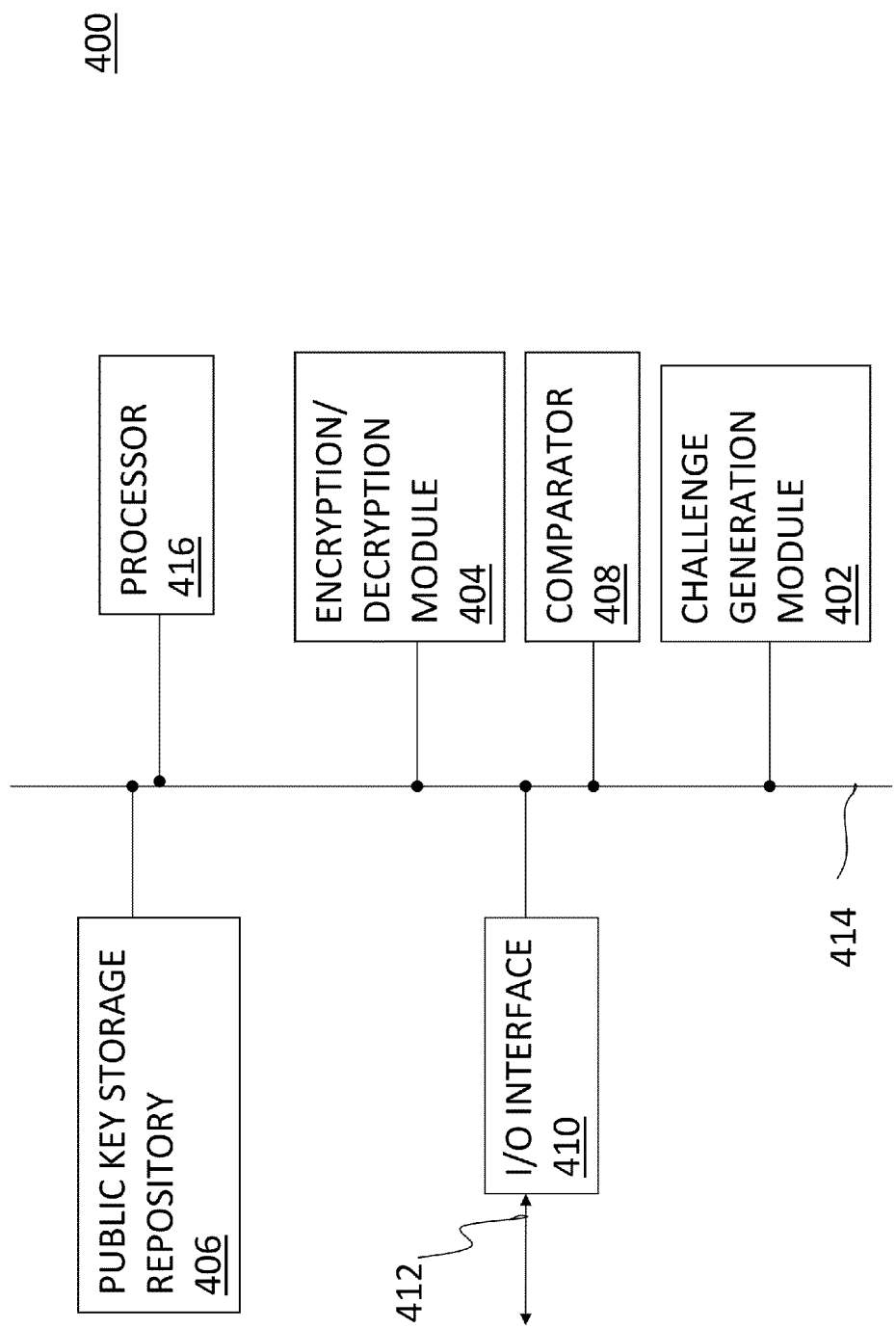
FIG. 4 is a block diagram of the verification server shown in FIG. 2, in accordance with an embodiment.

FIG. 4 is a block diagram of the verification server 400 shown in FIG. 2, in accordance with an embodiment. The verification server 400 includes a challenge generation module 402, an encryption/decryption module 404, a public key storage repository 406, a comparator 408, an I/O interface 410, and a processor 416 each connected to a bus 414 for communicating with each other. The verification server 400 can execute entirely on a computer, for example, a server, or some elements of the verification server 400, for example, the encryption/decryption module 404, can execute on a computer, while other elements execute on a remote computer, for example, a server. The encryption/decryption module 404 can include hardware, software, firmware, or a combination thereof. The I/O interface 410 includes a connector 412 that can include a LAN, WAN, or other connection for coupling to the communications network 100. In this manner, electronic information can be sent to and received by the verification server 400 via the I/O interface 410.

The challenge generation module 402 generates a challenge request such as a random challenge, authentication token, and the like. The challenge request can be created according to techniques readily known to those of ordinary skill in the art. The challenge request can be generated to include alphanumeric characters, special characters, and the like.

In preferred embodiment, the generated challenge request or other electronic information is transmitted via a connector 412 of the I/O interface 410 in cleartext to the information security system 300. The challenge response can optionally be encrypted by the encryption/decryption module 404 prior to transmission using the public key located in the public key storage repository 406.

As described above, the information security system 300 can encrypt the challenge request, for example, using the challenge encryption module 316 shown and described in FIG. 3. The encrypted challenge request is received by the encryption/decryption module 404, which decrypts the encrypted challenge request sent from the information security system 300 using the public key of the key pair, which can be stored in the public key storage repository 406.

The encryption/decryption module 404 can encrypt electronic information prior to output to the communications network 100 via the I/O interface 410. For example, the encryption/decryption device 404 can encrypt vendor information, which can be sent to the information security system 300 with the challenge request. This information can be encrypted with the public key stored in the public key storage repository 406.

The comparator 408 compares the decrypted challenge message sent by the information security system 300 with the original challenge message. If there is a match, then the comparator 408 generates a verification result indicating that the purchase request is authorized. The verification result can be output via the I/O interface 410 directly to the user computer. Alternatively, the verification result can be output to an intermediary party such as an e-commerce server or an online security server. If the comparison by the comparator 408 determines that there is not a match, then the verification result can include a notification to the authorizing party, the user, and/or the online merchant that the purchase request is denied.

Figure 5:
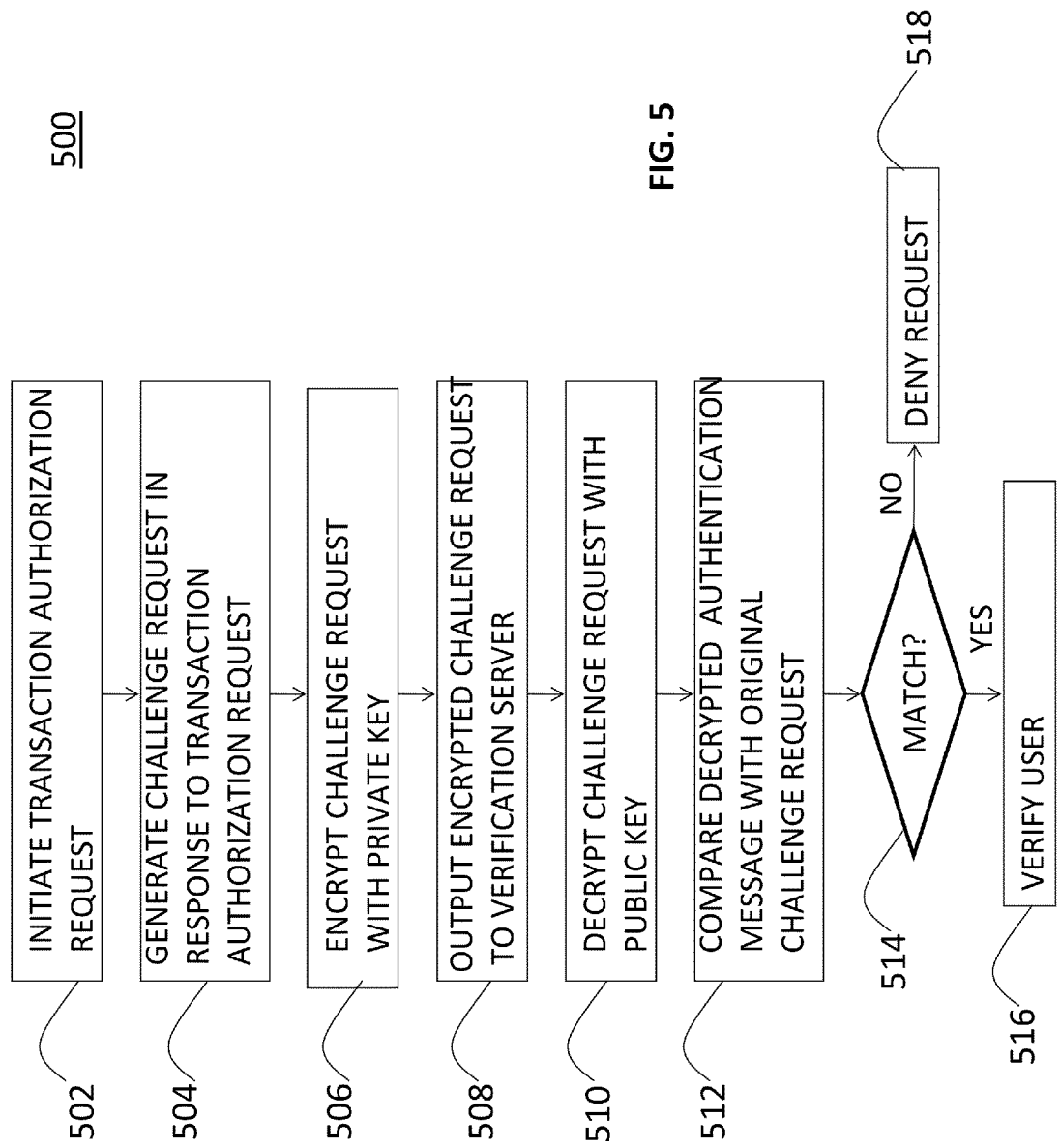
FIG. 5 is a flowchart of a method for authorizing an online transaction, in accordance with an embodiment.

FIG. 5 is a flowchart of a method 500 for authorizing an online transaction, in accordance with an embodiment. Some or all of the method 500 can be performed on the information security system 300 described with reference to FIG. 3, and/or the verification server 400 described with reference to FIG. 4. In describing the method 500, reference is also made to FIGS. 1-4.

The method 500 commences with a user initiating from a user computer or other electronic device an online transaction with another online party. The online transaction can be an e-commerce purchase, a personal electronic communication with an online social network service, or other online activity requiring user authentication and/or authorization by an authorizing party, such as a bank, credit card issuer, and the like, or a non-financial entity such as a social network verification server. For example, a user can select one or more items for purchase from an online merchant's website, and add them to the website shopping cart. The user can select the "checkout" button from the e-commerce application presented from the website server.

When the user initiates an online transaction, a transaction authorization request 502 is submitted from the user computer to the online merchant, for example, an online security server (not shown) in communication with the online merchant's website. The online merchant in turn sends the transaction authorization request to an authorizing party, such as a bank, credit card company, or other authorizing party in communication with the verification server 400.

The transaction authorization request 502 can be similar to that described in steps 112 and 114 shown in FIG. 1, except that personal information such as a credit card number is preferably not transmitted between a user, the online merchant, and the authorizing party during the online transaction, for example, when the transaction authorization request 502 is made. Instead, the user provides minimum identification information such as a username and an authorizing issuer ID, such as a credit card identification "Visa," or other identifier. In a preferred embodiment, the credit card number or related personal or sensitive information is not sent to the online merchant from the user computer. Instead, the authorizing party stores this information on a secure server or other storage device, and relies on the verification server 400 to determine whether the user is authorized to complete the online transaction. The username, the authorizing issuer ID, and/or other electronic information, for example, the IP address of the user computer, can be sent in cleartext, or can be encrypted with the private key of the information security system 300.

A challenge request is generated 504 by the authorizing party, for example, the verification server 400 in communication with the authorizing party, in response to the transaction authorization request 502. The challenge request can include a random challenge message as described above. The random challenge message can be generated as a phrase, string, or value according to a challenge protocol or technique known to those of ordinary skill in the art. The challenge request sent from the verification server 400 to the user computer can alternatively include an image and/or keyphrase predetermined by the user. These items can appear on a display, for example, shown in FIG. 13, corroborating that the transaction include a trusted source, as a technique for anti-spoofing. In a preferred embodiment, the challenge request is generated for transmission to the user computer in cleartext. In another embodiment, the challenge request is cryptographically protected, for example, encrypted using a public key of the key pair generated by the user.

Figure 14:
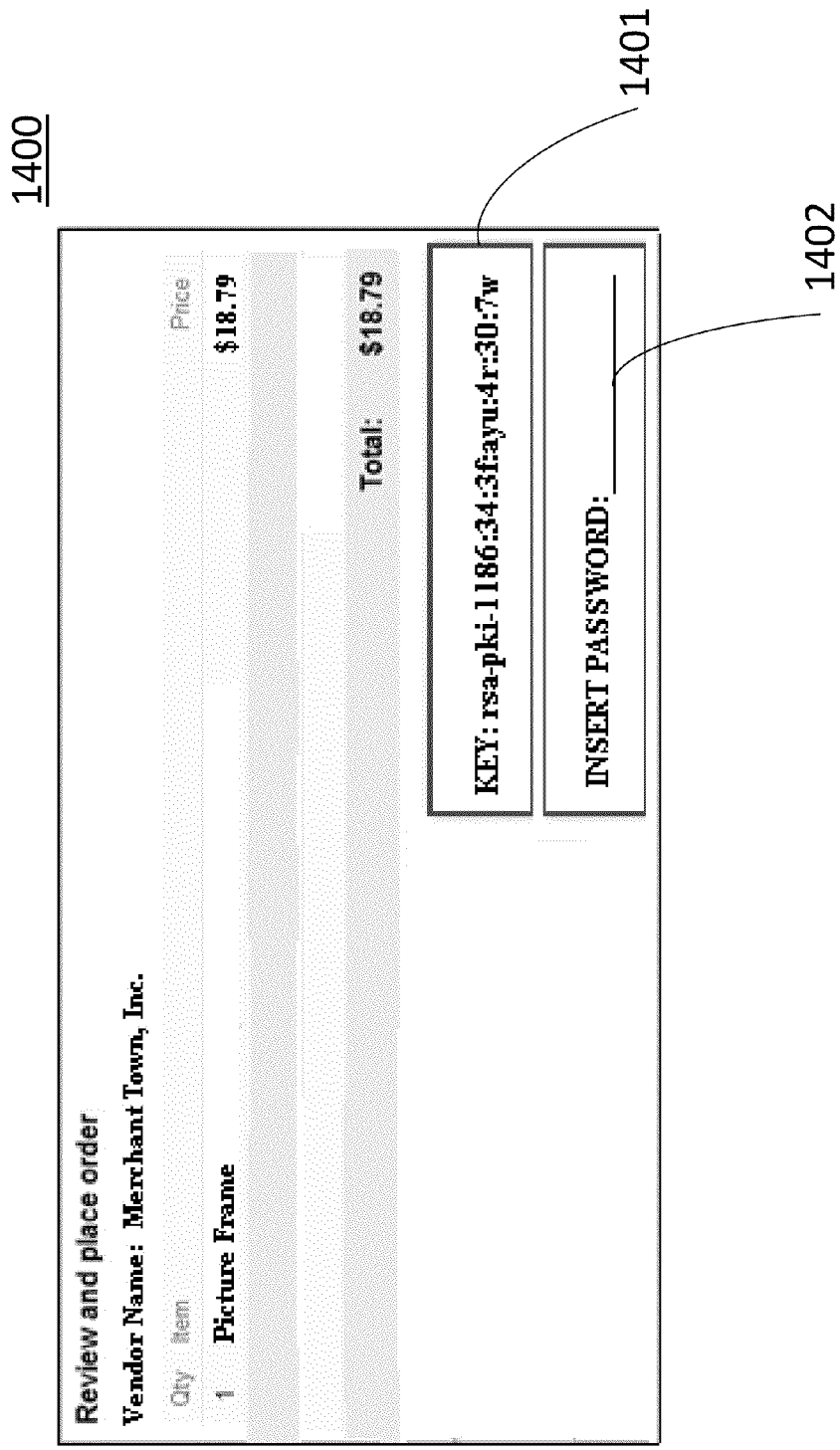
FIG. 14 is a screenshot of a purchasing popup window for entering information related to a secure online transaction, in accordance with an embodiment.

The challenge request is transmitted from the verification server 400 to the information security system 300. The destination of the challenge request can be determined from the IP address of the user computer provided to the verification server 400. An application such as a purchasing application can be activated on the user computer in response to receiving the challenge request. The application can provide a window, screen, and the like on the computer display, which prompts the user to enter a password, for example, as shown in FIG. 14. The password is used to decrypt the private key. The private key in turn encrypts 506 the challenge request received from the verification server 400. The private key can alternatively encrypt other electronic information to be transmitted from the user computer, for example, the username, a social network introduction, or other information related to the authorization request. Other examples of electronic information include a confidentiality key, token, or data corresponding to the online transaction. The challenge request and/or other electronic information transmitted with the challenge request can optionally be encrypted at the verification server 400, decrypted by the private key, and/or re-encrypted by the private key. If the user declines to enter the password, or enters it incorrectly, the authorizing party, then the online merchant, or any intermediary party therebetween, can receive a corresponding notification informing the party that the request is denied.

The encrypted challenge request is output 508 from the user computer to the verification server 400. The encrypted challenge request is decrypted 510 in the verification server 400, for example, by a public key generated as part of a key pair with the private key.

The decrypted challenge request is compared 512 with the challenge request sent in step 504. If there is a match 514 between the responsive decrypted challenge request and the original challenge request, then the transaction authorization request is accepted and the user is verified 516, for example, by a notification sent to the user computer. If there is not a match 514, then the transaction authorization request is denied 518, and a notification is sent to the user computer, informing the user that the request is denied.

Figure 6:
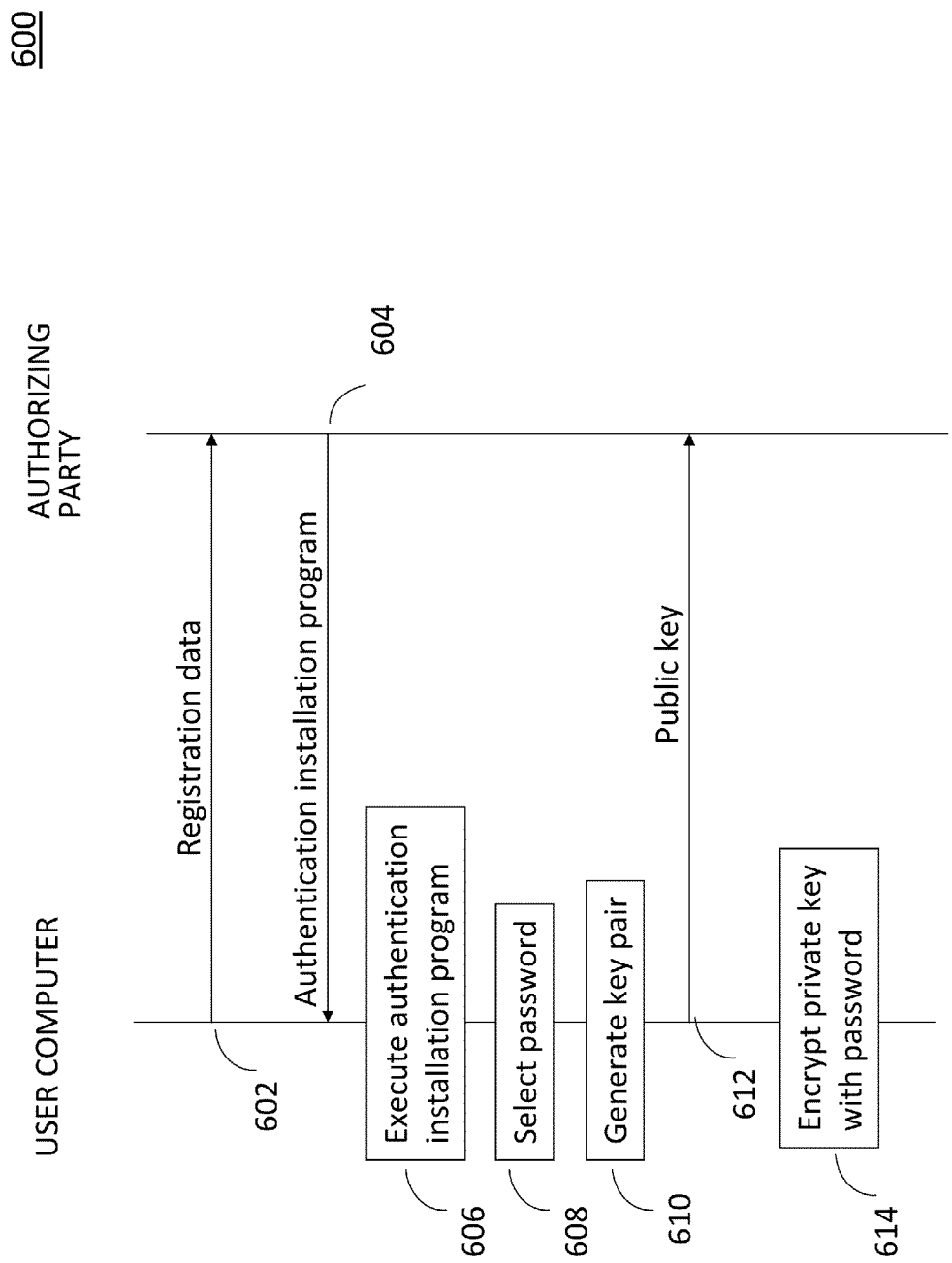
FIG. 6 is a sequence chart illustrating a method for configuring a user electronic device to communicate with an authorizing party, in accordance with an embodiment.

FIG. 6 is a sequence chart illustrating a method 600 for configuring a user computer or other electronic device for communicating with an authorizing party, in accordance with an embodiment. Some or all of the method 600 can be employed in the network diagram 10 shown in FIG. 1 and/or the network diagram 20 shown in FIG. 2. Some or all of the information security system 300 shown in FIG. 3 can be provided by the method 600. Some or all of the verification server 400 shown in FIG. 4 can be provided by the method 600. In describing the method 600, reference is also made to FIGS. 1-5. The method 600 described with reference to FIG. 6 is preferably performed prior to the method 500 described herein with regard to FIG. 5, or the method 700 with regard to FIG. 7.

Prior to performing an online transaction, the user can register 602 with an authorizing party such as a credit card issuer to receive security features for the user computer such as a protection service offered by the authorizing party. In doing so, the user can open a bank account, order a credit card, and the like, with the authorizing party, or with another party in communication with the authorizing party, such as an online merchant, or the user can join a non-financial entity such as a social network service. The social network service can include an authorizing party that permits the register user to communicate with other users of the service in a secure manner. For example, users can be verified by the authorizing party prior to communication with other users of the social network service.

The user can register the authorizing party by logging into a website and completing an online application to sign up for the protection service offered by the authorizing party. Here, the user can create a unique username or other identification. The username can be provided by the user to more than one credit card issuer, bank, or other institution or service, which can reduce the burden on the user to retain multiple registration parameters, for example, a username and password for each authorizing party. The username or other identification can be retained by the authorizing party. The user can enter additional information such as address, credit history, etc., which can likewise be retained by the authorizing party.

When the user registers with the authorizing party, the user can receive an identifier from the authorizing party, for example, an authorizing issuer ID. The authorizing issuer ID can be a simple, easy to remember identification, such as the term "Visa." Thus, the user can provide the same username to different credit card issuers, banks, and the like, for the purpose of memorizing a single username, as long as the username is unique to the bank to avoid issues with other customers with the same username. However, the credit card issuers, banks, and the like can be distinguished from each other by providing unique authorizing issuer IDs to the user.

The credit card issuer, bank, and the like can store a phrase or image or other identifier selected by the user to ensure anti-spoofing, for example, the changing the phrase or image during each session with the user computer. This can be received by the verification server, for example, from the authorizing party. The anti-spoofing identifier can be encrypted using a public key of a key pair. The user can decrypt the anti-spoofing identifier with a private key of the key pair corresponding to the public key upon receipt of the identifier.

The user can receive an authentication installation program 604 by downloading the program from the authorizing party's website. The authentication installation program can be executed 606 on the user computer, or executed on an external device in communication with the user computer such as a USB flash memory device. The authentication installation program includes components that are related to the online transaction process, such as a key pair generator application or other elements of the information security system 300 described herein, and/or other applications, for example, a purchasing application. These components are installed on the user computer, for example, the storage repository 310 shown in FIG. 3 or other computer-readable storage medium having computer readable program code embodied therewith. The authentication installation program can be executed by a processor in the user computer. One of the components can include a user interface that permits the user to configure the key pair generator application and/or the purchasing application. The user interface can be presented in a pop-up window or other display application to the user for entering input data.

One such input data is a password, which can be selected 608 by the user. The password can be generated once by the user. For example, the user can create a phrase, alphanumeric sequence, and the like, for use as a password, and enter it into the user interface. The installation program processes the password, so that it can be provided in response to a challenge request, for example, described herein. The password can subsequently be used as a passphrase key for encrypting and/or decrypting a key pair during an online transaction. The user can enter the user-defined password locally on the user computer. Thus, the password need not be transmitted over the communications network 100.

During installation, the key pair is generated 610. In particular, a private key is generated, for example, by the key pair generation module 302 shown in FIG. 3. Also, a public key is generated, for example, by the key pair generation module 302 shown in FIG. 3. The private key is stored locally on the user computer, for example, in the storage repository 310 shown in FIG. 3, or a storage repository external to but in communication with the user computer, for example, a USB flash memory device.

The public key is provided 612 to the authorizing party, for example, the verification server 400 of the authorizing party. Thus, the verification server 400 can store the public key and/or other user information, for example, a username or other user identification.

The private key is encrypted 614 with the password, and remains in encrypted form while stored. The private key can only be decrypted by entering the correct password. The private key can be encrypted, decrypted, and re-encrypted one or more times so long as the correct password is provided.

Figure 7:
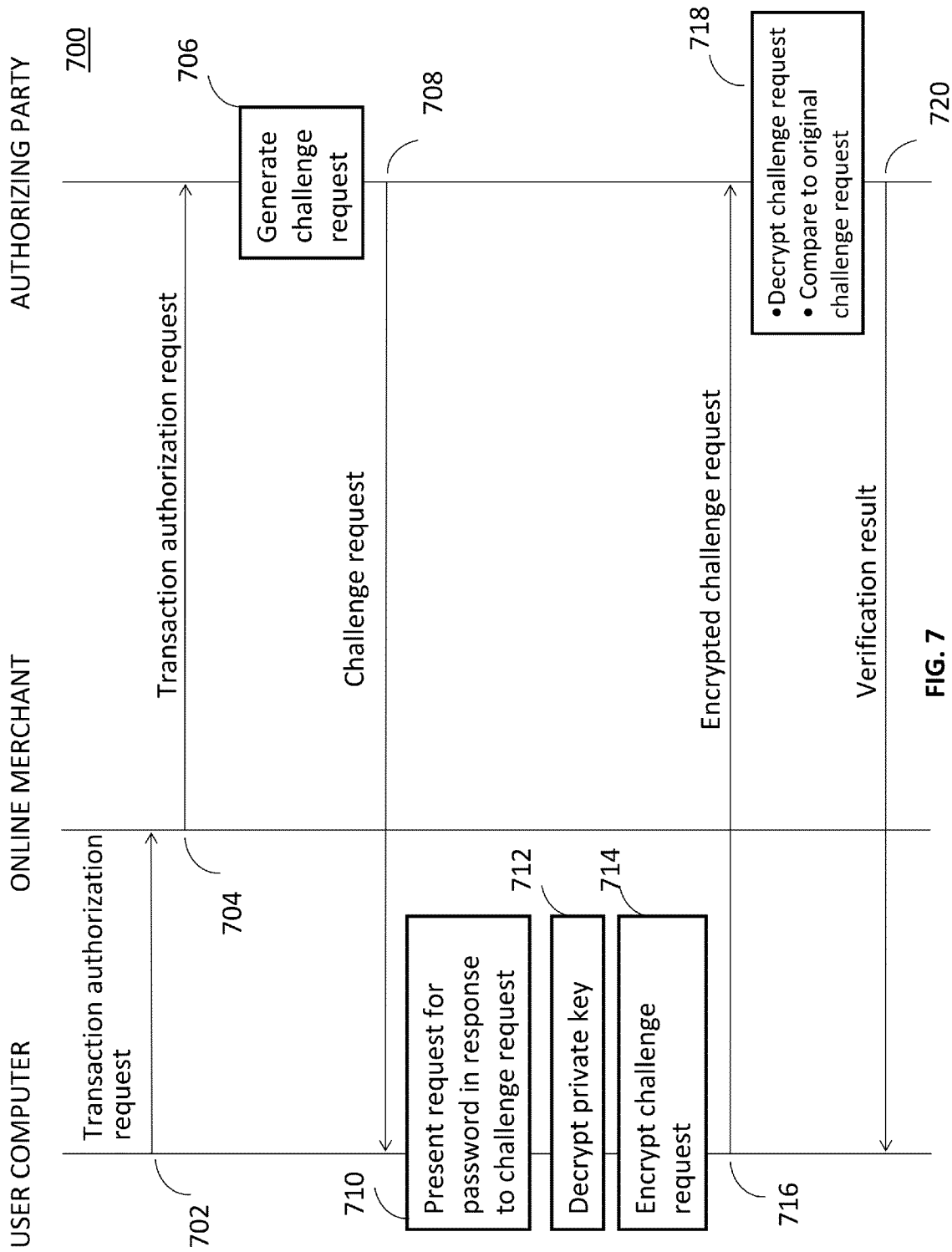
FIG. 7 is a sequence chart illustrating a method for securing online transactions, in accordance with an embodiment.

FIG. 7 is a sequence chart illustrating a method 700 for securing an online transaction, in accordance with an embodiment. Some or all of the method 700 can be employed in the network diagram 10 shown in FIG. 1 and/or the network diagram 20 shown in FIG. 2. Some or all of the information security system 300 shown in FIG. 3 is provided by the method 700. Some or all of the verification server 400 shown in FIG. 4 is provided by the method 700. In describing the method 700, reference is also made to FIGS. 1-6.

The method 700 can commence with a transaction authorization request 702 initiated from an electronic device such as a user computer to perform an online transaction, for example, to purchase an item from an online merchant's website. The request 702 can be made to an online merchant after the user has selected the item for purchase and proceeds to complete the transaction in a "checkout" window presented to the user computer by the online merchant's website, where the user is requested to enter an identification such as a username and authorizing issuer ID, for example, described above. In this manner, sensitive information such as a credit card number, an ATM PIN number, a social security number, a home address, and the like, need not be transmitted from the user computer during the online transaction.

The merchant or merchant's service provider such as a processing acquirer or payment processor can receive the identification information from the user computer, and in response can submit a transaction authorization request 704 to an authorizing party, for example, described herein. The transaction authorization request includes the user identification information sent from the user computer with the transaction authorization request 704. In addition, the transaction authorization request can include vendor information, such as the purchase value of the item to be charged or withdrawn.

The authorizing party generates a challenge request 706, and transmits the challenge request 708 to the user computer. The challenge request 706 can be transmitted to the user computer via an intermediary, for example, a payment processor, or the challenge request 706 can be transmitted directly to the user computer. In a preferred embodiment, the challenge request 706 includes a random challenge for example described herein.

The user computer is presented with a request 710 for a password in response to receiving the challenge request. The request can be displayed in a popup window, for example, in a purchasing application installed on the user computer.

The user computer decrypts the private key 712 with the password, for example, described herein. The user computer encrypts the challenge request 714 with the decrypted private key, for example, using encryption techniques known to those of ordinary skill in the art. The user computer sends 716 the encrypted challenge request to the authorizing party.

The authorizing party decrypts 718 the challenge request using the public key, and compares the decrypted challenge request to the original challenge request. The authorizing party outputs a verification result 720 to the user computer, either verifying the user or denying the request.

Figure 8:
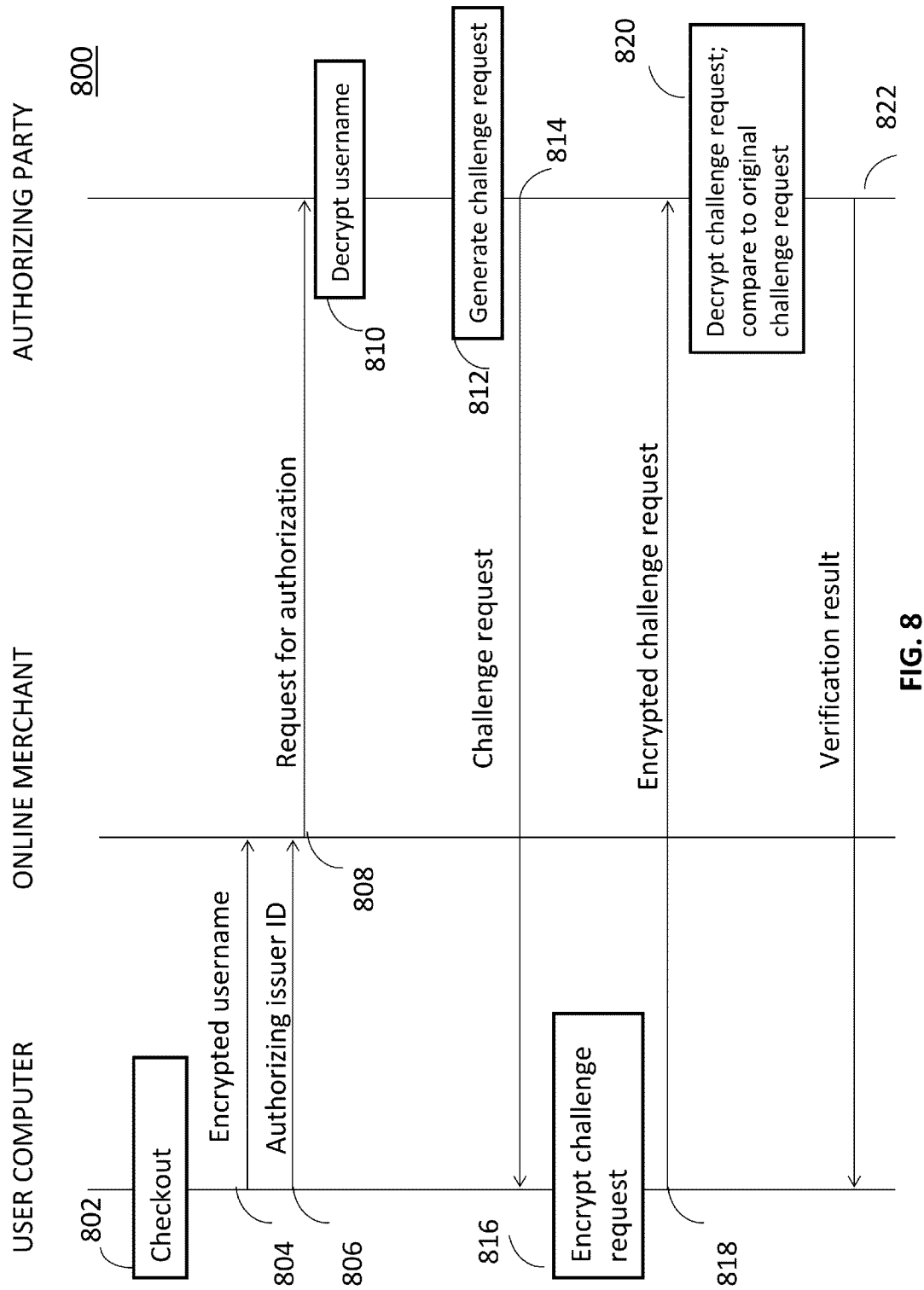
FIG. 8 is a sequence chart illustrating a method for securing online transactions, in accordance with another embodiment.

FIG. 8 is a sequence chart illustrating a method 800 for securing online transactions, in accordance with another embodiment. Some or all of the method 800 can be employed in the network diagram 10 shown in FIG. 1 and/or the network diagram 20 shown in FIG. 2. Some or all of the information security system 300 shown in FIG. 3 is provided by the method 800. Some or all of the verification server 400 shown in FIG. 4 is provided by the method 800. In describing the method 800, reference is also made to FIGS. 1-7.

The method 800 can commence with the user performing an online transaction at an online checkout 802 at a merchant website presented for example from an e-commerce server. For example, the user selects an item for purchase at the merchant website and a checkout process is initiated at the merchant website. A purchasing popup window can be presented on a user computer or other electronic device, providing an input field for the user to enter a username and an authorizing issuer ID such as a credit card ID described above. An input field is also provided for the user to enter a password. When the user enters a correct password, the password decrypts a private key. The username can be encrypted with the decrypted private key. The encrypted username 804 is output from the user computer to the merchant's e-commerce server. The authorizing issuer ID 806 is likewise output to the e-commerce server in cleartext. Other information such as the user computer IP address can be output as part of the transaction authorization request, either encrypted or in cleartext.

The merchant or the merchant's service provider such as a payment processor can receive the encrypted username 804, the cleartext authorizing issuer ID 806, and other information such as the user computer IP address and submit a transaction authorization request 808 to an authorizing party, for example, a credit card issuer, for example, to the verification server 400.

The authorizing party decrypts 810 the encrypted username, for example, with a public key corresponding to the private key. The authorizing party generates a challenge request 812, and transmits the challenge request 814 to the user computer. The challenge request 812 can be transmitted to the user computer via an intermediary, for example, the online merchant, or the challenge request 812 can be transmitted directly to the user computer. In a preferred embodiment, the challenge request 812 includes a random challenge, for example, described herein.

The user computer encrypts the challenge request 816 with the decrypted private key. The user computer outputs the encrypted challenge request 818 to the authorizing party.

The authorizing party decrypts 820 the challenge request using the public key of the key pair, and compares the decrypted challenge request to the original challenge request. The authorizing party outputs to a verification result 822 to the user computer, either accepting the authentication result and/or authorizing the purchase or denying the request.

Figure 9:
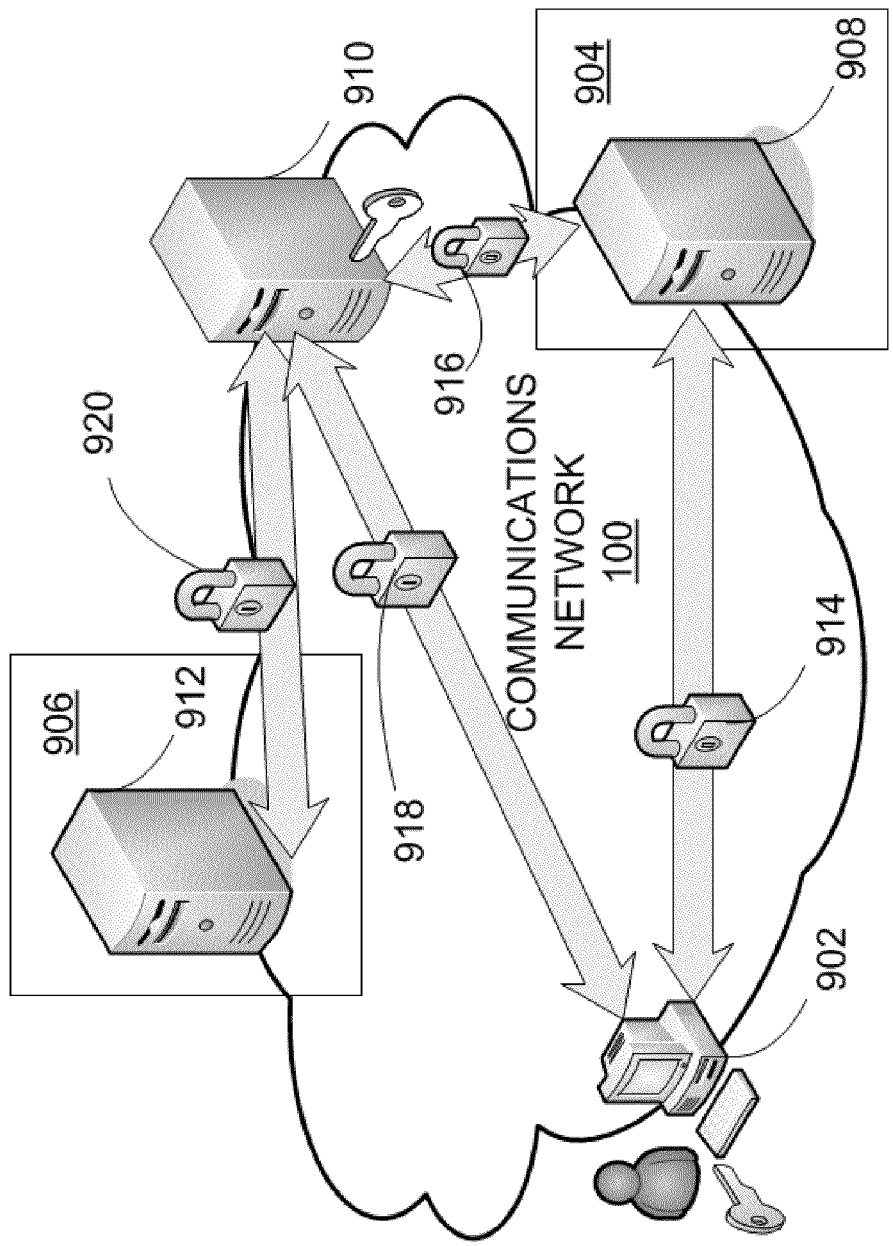
FIG. 9 is a schematic network diagram illustrating an online security server, in accordance with an embodiment.

FIG. 9 is a schematic network diagram 90 illustrating an online security server 910, in accordance with an embodiment.

A user computer 902, an online merchant 904, and an authorizing party 906 communicate with each other and with the online security server 910 via a plurality of bidirectional information flow paths 914, 916, 918, 920 via a communications network 100. Each information flow path 914, 916, 918, 920 can include one or more transmission paths, which can be established for the exchange of data described herein according to control protocols, routing protocols, and other electronic information delivery services known to those of ordinary skill in the art, for example, HTTPs (secure Hyper Text Transfer Protocol). Information flow paths 914, 916, 918, 920 can include intervening elements between a flow path originating element and a flow path terminating element. Intervening elements can include computer network servers, switches, routers, and the like.

The user computer 902 can be the same as or similar to the user computer 102 described herein. Accordingly, for the sake of brevity, a physical description of the user computer 902 will not be repeated. The user computer 902 can include an information security system 1100 described with reference to FIG. 11. The online merchant 904 includes an e-commerce server 908, which can be the same as or similar to the e-commerce server 108 described herein. Accordingly, for the sake of brevity, a physical description of the e-commerce server 908 will not be repeated. The authorizing party 906 includes an verification server 912, which can be the same as or similar to the verification server 110 described herein, for example, to validate information presented by the user such as credit card purchase requests and/or to either authorize a purchase request. Accordingly, for the sake of brevity, a physical description of the verification server 912 will not be repeated.

During an operation, an online purchase request is initiated from the user computer 902 to the online merchant 904. A username or other user identification can be transmitted from the user computer 902 to the e-commerce server 908. At this time, the user computer does not transmit sensitive customer information such as a credit card number, card verification value (CVV), or other sensitive information to the e-commerce server 108. Instead, the sensitive information is either stored on the online security server 910, or is output from the user computer 904 in encrypted form.

In addition, two different key pairs are provided for encrypting and decrypting information transmitted along the information flow paths 914-920. A first key pair, referred to as a user key pair, includes a user private key under the control of the user of the user computer 902 and a user public key that is stored in the online security server 910. A second key pair, referred to as an authorizer key pair, includes an authorizer private key under the control of the authorizing party 906 and an authorizer public key that is stored in the online security server 910 and/or the user computer 902. In this manner, information relevant to establishing an online transaction can be securely transmitted along the information flow paths 914-920.

Figure 10:
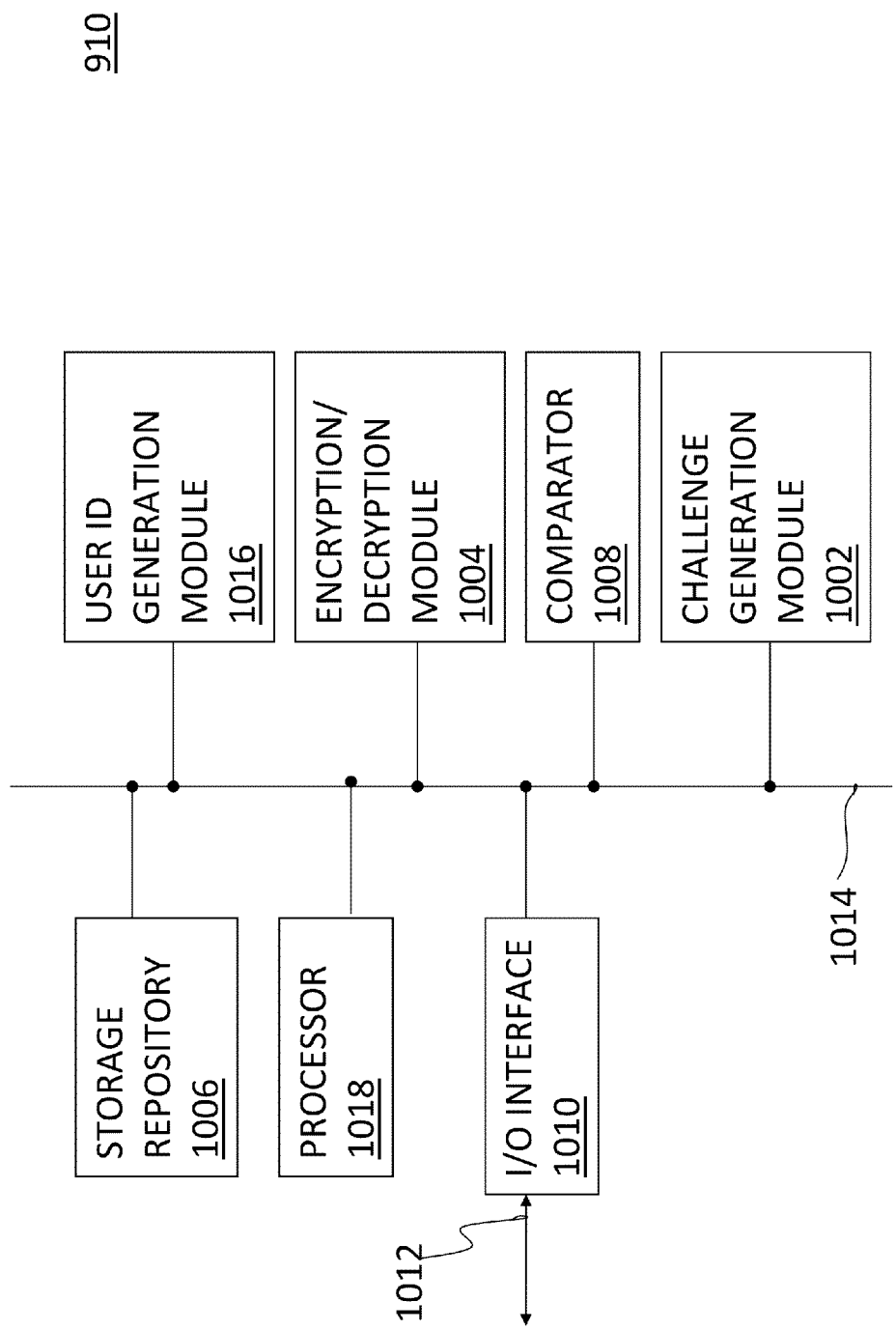
FIG. 10 is a block diagram of an online security server shown in FIG. 9, in accordance with an embodiment.

FIG. 10 is a block diagram of the online security server 910 shown in FIG. 9 in accordance with an embodiment. The online security server 910 includes a challenge generation module 1002, an encryption/decryption module 1004, a storage repository 1006, a comparator 1008, a user identification (ID) generation module 1016, a processor 1018, and an I/O interface 1010, each connected to a bus 1014 for communicating with each other. The online security server 910 can execute entirely on a computer, for example, a server, or some elements of the online security server 910, for example, the encryption/decryption module 1004, can execute on a computer, while other elements execute on a remote computer, for example, a server. The online security server 910 can include hardware, software, firmware, or a combination thereof. The online security server 910 can be part of, or in communication with, a payment portal, an authorizer server, or other elements of a secure e-commerce network environment, social network environment, or other configuration including the transfer of sensitive or personal information.

The I/O interface 1010 includes a connector 1012 that provides a LAN connection, a WAN connection, or other network connection known to those of ordinary skill in the art for coupling to the communications network 100. In this manner, electronic information can be sent to and received by the online security server 910 via the I/O interface 1010.

The challenge generation module 1002 generates a challenge request such as a random challenge, authentication token, and the like. The challenge request can be created according to techniques readily known to those of ordinary skill in the art. The challenge request can be generated to include alphanumeric characters, special characters, and the like.

The storage repository 1006 can store sensitive user information such as credit card information, address information, etc. The storage repository 1006 can store at least one of a user public key of a user key pair and an authorizer public key of an authorizer key pair.

The encryption/decryption module 1004 can retrieve either the user public key or the authorizer public key to decrypt or encrypt data received from the user computer 902 and the authorizing server 912, respectively. In one example, the encryption/decryption module 1004 can decrypt an encrypted challenge request received from the user computer 902 with the user public key. In another example, the encryption/decryption module 1004 can encrypt an authorizer public key, for example, a secure sockets layer (SSL) certificate.

The comparator 1008 compares a challenge message encrypted by the user computer 901 and decrypted by the encryption/decryption module 1004 with the original challenge message generated by the challenge generation module 1002 to determine a match. If there is a match, then, in an embodiment where sensitive user information is stored on the online security server 910, the sensitive information is encrypted by the encryption/decryption module 1004 using the bank public key and output to the authorizing party 906/912. In another embodiment where sensitive user information is not stored on the online security server 910, the online security server encrypts the authorizer public key stored in the storage repository 1006 with the user public key and outputs the encrypted authorizer public key to the user computer 902. If the comparison by the comparator 1008 determines that there is not a match, then the online security server 910 can output a notification to the authorizing party, the user, and/or the online merchant that the purchase request is denied.

The user ID generation module 1016 generates a username or other user identification that is provided to the user during registration of the user computer 902 with the online security server 910. The user identification is transmitted from the user computer 902 to the online security server 910 during an online transaction request. The user can register with the online security server 910 by providing the user identification.

Figure 11:
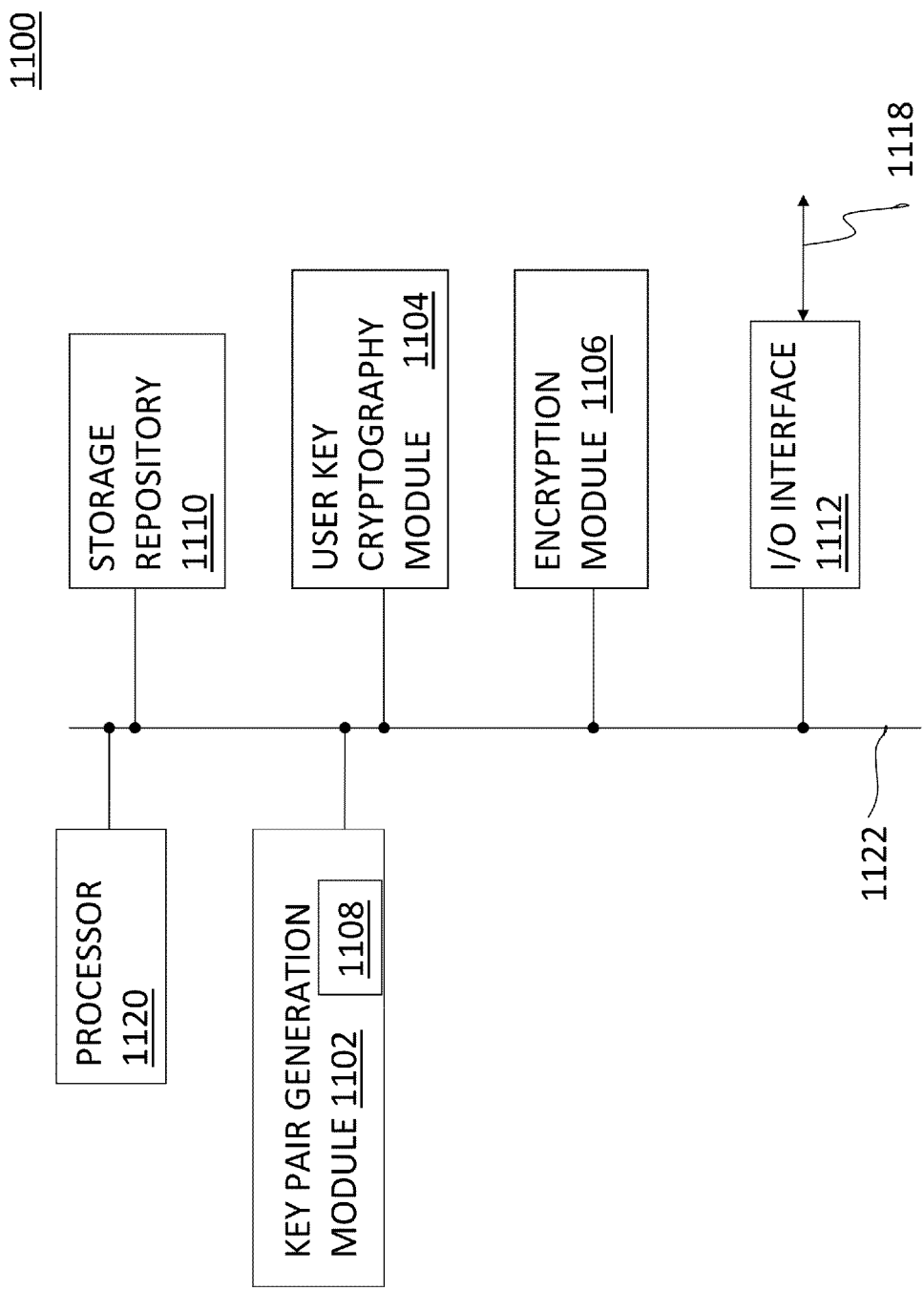
FIG. 11 is a block diagram of an information security system, in accordance with an embodiment.

FIG. 11 is a block diagram of an information security system 1100, in accordance with an embodiment. The information security system 1100 can be located on the user computer 902 described with respect to FIG. 9. Elements of the information security system 1100 can be downloaded to the user computer 902 as part of an installation program provided from a remote location, for example, stored on a computer server at an authorizing party. The installation program can include a purchasing application or other software applications applicable to an online transaction. The information security system 1100 can be configured to communicate with the purchasing application or other software applications, whether the information security system 1100 and the other applications are co-located on a same hardware platform or are separate from each other. The information security system 1100 can execute entirely on a computer, for example, a server, or some elements of the information security system 1100 can execute on the user computer 902, while other elements, for example, the encryption module 1116, execute on a remote computer, for example, a server. The information security system 1100 can include hardware, software, firmware, or a combination thereof.

The information security system 1100 includes a processor 1120 in communication with a key pair generation module 1102, a storage repository 1110, a user key cryptography module 1104, an encryption module 1106, and an I/O interface 1112 over a communications bus 1122. A user can communicate with the information security system 1100 by way of a connector 1118 of the I/O interface 1112, for example, using one or more input devices such as a keyboard, mouse, and the like. The connector 1118 can include a LAN, WAN, or other connection for coupling to the communications network 100. The I/O interface 1112 can include one or more inputs and/or outputs for communicating with various elements of the information security system 1100.

The key pair generation module 1102 is similar to the key pair generation module 302 described in FIG. 3. Accordingly, for the sake of brevity, a physical description of the key pair generation module 1102 will not be repeated. The key pair generation module 1102 generates a key pair, namely, a user private key and a user public key. The user private key can be stored in the storage repository 1110, or an external storage device such as flash memory. The user public key can be stored in the online security system 910.

The key pair generation module 1102 can include a passphrase generation module 1108 that generates a password, a passphrase, and the like provided by the user for encrypting and/or decrypting the user private key. When the key pair generation module 1102 generates the key pair, the user can select the password, for example, by entering the password in an application window displayed on a computer monitor or screen (not shown).

The user key cryptography module 1104 encrypts and/or decrypts at least one of the user private key and the user public key of the key pair according to cryptography techniques known to those of ordinary skill in the art. In a preferred embodiment, the user key cryptography module 1104 encrypts the private key using the user-defined password generated by the passphrase generation module 1108. The private key is preferably encrypted prior to storage in the storage repository 1110. The private key is decrypted prior to use for encrypting a challenge request, authorizing issuer ID, or other data prior to output from the information security system 1100.

The encryption module 1106 encrypts information received from the online security server, the authorizing party, or the online merchant, and outputs the encrypted information in a secure manner to the online security server, the authorizing party, or the online merchant. The encryption module 1106 can encrypt the information using the private key stored in the storage repository 1110. In an embodiment, the encryption module 1106 encrypts an authorizing issuer ID corresponding to a bank, credit card company, or other entity responsible for verifying the user. In another embodiment, the encryption module 1106 encrypts a challenge message or other challenge request. In another embodiment, the encryption module 1106 encrypts sensitive or personal data, such as credit card information or a password using the authorizer public key, for example, including an SSL certificate.

Figure 12:
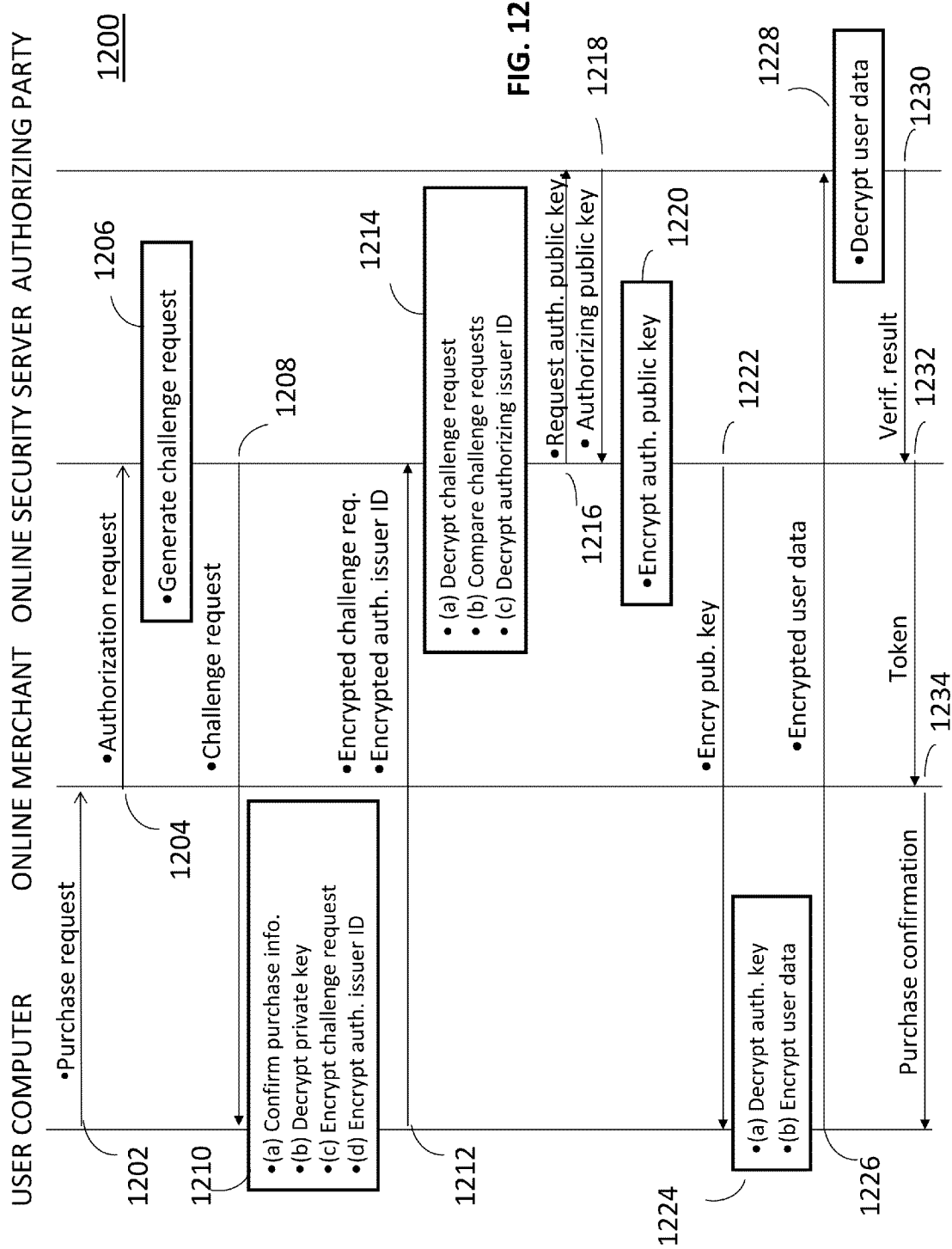
FIG. 12 is a sequence chart illustrating a method for securing online transactions with an online security server, in accordance with an embodiment.

FIG. 12 is a sequence chart illustrating a method 1200 for securing online transactions with an online security server, in accordance with an embodiment. Some or all of the method 1200 can be employed in the online security server 910 shown in FIGS. 9 and 10. Some or all of the method 1200 can be employed in the information security system 1100 shown in FIG. 11, which can be configured with the user computer 902 shown in FIG. 9. In describing the method 1200, reference is also made to FIGS. 9-11.

Prior to performing the method 1200, a user of a computer, smartphone, or other electronic device can register with the online security server 910 by establishing a username or other user identification subject to availability. The user identification is used by the online security server 910 in part to authenticate and/or authorize the user according to embodiments described herein. When the user registers with the online security server 910, a user public key of a user public key pair can be stored on the online security server 910. Prior to performing the method 1200, the user can also register with the authorizing party 906 according to a registration process the same as or similar to that described in FIG. 6. For example, during registration with the authorizing party 906, the user can receive an authorizing issuer ID to distinguish the authorizing party from other credit card issuers, banks, and the like. Prior to performing the method 1200, the user can also register with an online merchant in a manner similar to that described above, for example, entering a username and password to log into an e-commerce website or social network service.

The method 1200 commences with a user providing a purchase request 1202 to an online merchant, for example, the e-commerce server 908 of the online merchant 904 described in FIG. 9. In an embodiment, a user identification such as the username provided during registration with the online security server 910 is output with the purchase request to the online merchant 904. In an embodiment, the user identification is output from the user computer as cleartext to the online merchant 904. In another embodiment, the user identification is encrypted with a user private key of a user key pair.

The online merchant 904 provides an online security server, for example, online security server 910 described in FIG. 9, with a transaction authorization request 1204. The transaction authorization request 1204 can include the user identification information sent from the user computer 902 with the purchase request 1202.

The online security server 910 generates a challenge request 1206 such as a random challenge, authentication token, and the like in response to the transaction authorization request 1204. The challenge request 906 can be generated according to techniques readily known to those of ordinary skill in the art. The challenge request 1206 is output 1208 from the online security server 910 directly to the user computer 902, or via the online merchant 904 to the user computer 902. The challenge request 1206 can be output as cleartext, or can be encrypted by the online security server 910 prior to transmission. The online security server 910 can also output purchase information received from the online merchant 904, such as purchase price, description, and the like. This information can likewise be transmitted as cleartext or encrypted form.

The user computer 902 receives the purchase information and confirms 1210(a) whether the user intended to make the purchase. The user can confirm a purchase by selecting a button or key on a display, for example, provided by a purchase application. If the user confirms the purchase request, the user can be requested to identify a type of payment, for example, credit card, check, debit card, etc. to be used as a source of payment for the purchase.

The user computer is also presented with a request for a password in response to receiving the challenge request, similar to step 710 described in FIG. 7. The user computer decrypts the private key 1210(b) with the password, for example, described herein. The user computer encrypts the challenge request 1210(c) with the decrypted private key, for example, using encryption techniques known to those of ordinary skill in the art. In response to the request to identify a type of payment, the user computer can also encrypt an authorizing issuer ID 1210(d), for example, a credit card identification such as "Visa" or bank identification information corresponding to the identified payment type using the user private key. The authorizing issuer ID 1210(d) can be used by the online security server 910 to request an authorizer-specific public key for decrypting information received from the authorizing party 906. The user computer outputs 1212 at least one of the encrypted challenge request and the encrypted authorizing issuer ID to the online security server 910.

The online security server 910 decrypts 1214(a) the encrypted challenge request using the user public key of the user key pair. The decrypted challenge request is compared 1214(b) with the original challenge request generated by the online security server at step 1206. If the comparison does not produce a match, then the transaction authorization request is denied. The user can optionally receive a notification that the authorization request is denied. If the comparison is positive, for example, a match, then the online security server can send a request 1216 to the authorizing party for an authorizer public key of an authorizer key pair, for example, an authorizing party encryption certificate or an SSL certificate. Alternatively, the authorizer public key can be stored in the storage repository 1006 of the online security server 910.

The online security server 910 can also decrypt 1214(c) the authorizing issuer ID to determine which authorizing party to contact, for example, a credit card issuer or a bank. In response, the identified authorizing party, for example, authorizing party 906 described in FIG. 9, outputs an authorizer public key 1218 to the online security server 910.

In an embodiment, the online security server 910 encrypts the authorizer public key 1220, for example, an SSL certificate, using the user public key, and outputs 1222 the encrypted authorizer public key to the user computer 902.

The user computer 902 decrypts the authorizer public key 1224(a) with the user private key. The user computer 902 encrypts user information 1224(b) such as a credit card number with the authorizer public key. The encrypted user information is output 1226 to the authorizing party either directly from the user computer or to the online security server 910 which in turn provides the encrypted user information to the authorizing party 906. The online security server 910 does not possess an authorizer private key and is therefore prevented from decrypting the user information. In this manner, the user information is encrypted from its point of origin at the user computer to the authorizer party 906.

The authorizing party 906 decrypts 1228 the user data using the authorizer private key of the authorizer key pair, and either approves or denies the online transaction. In doing so, the authorizing party 906 generates a verification result 1230 and outputs the verification result to the online security server 910, indicating whether the purchase request is approved.

In response to the receiving the verification result 1230 authorizing the transaction, the online security server 910 can generate a payment token, also referred to as a payment data transfer token, to the online merchant 904. For example, the online security server 910 in communication with a payment processor, also referred to as a token provider, can create a special data packet, referred to as a called a token, payment token, or transaction token, which does not contain any sensitive information such as credit card information. The online security server 910 can output the token 1232 to the e-commerce server 908. In response, the e-commerce server 908 can request that the payment processor process the transaction by submitting the transaction request to a credit card network and the like. In response, the e-commerce server 908 can output a purchase confirmation 1234 to the user computer 902.

Figure 13:
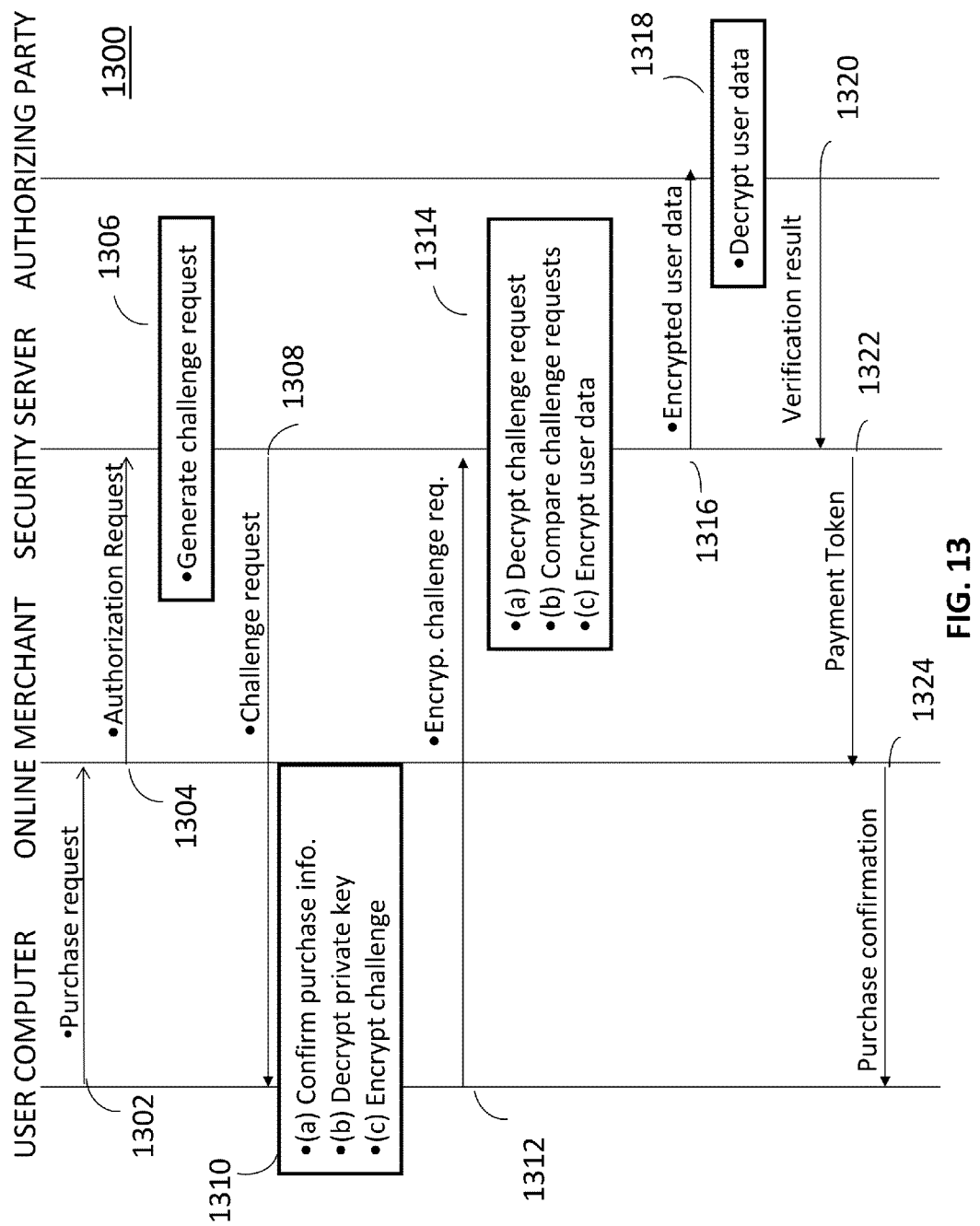
FIG. 13 is a sequence chart illustrating another method for securing online transactions with an online security server, in accordance with an embodiment.

FIG. 13 is a sequence chart illustrating a method 1300 for securing online transactions with an online security server, in accordance with an embodiment. Some or all of the method 1300 can be employed in the online security server 910 shown in FIGS. 9 and 10. Some or all of the method 1300 can be employed in the information security system 1100 shown in FIG. 11, which can be configured with the user computer 902 shown in FIG. 9. In describing the method 1200, reference is also made to FIGS. 9-12. Registration steps similar to those described above can be performed prior to the method 1300 and will not be repeated for the sake of brevity.

The method 1300 commences with a user providing a purchase request 1302 to an online merchant, for example, the e-commerce server 908 of the online merchant 904 described in FIG. 9. The purchase request 1302 can be similar to the purchase request 1202 described in FIG. 12, namely, the purchase request 1302 includes a user identification such as a username corresponding to an online security server, for example, the online security server 902 described in FIG. 9. The online merchant 904 outputs this information as part of a transaction authorization request 1304 to the online security server 910.

The online security server 910 generates a challenge request 1306 to the transaction authorization request 1304. The challenge request 1306 can be similar to those described above, for example, a random challenge. Accordingly, a description will not be repeated for the sake of brevity. The challenge request 1306 is output 1308 from the online security server 910 directly to the user computer 902, or via the online merchant 904 to the user computer 902.

The user computer 902 confirms 1310(*a*) whether the user intended to make the purchase, for example, similar to step 1210(*a*) described above. The user computer can also presented with a request for a password in response to receiving the challenge request, similar to step 710 described in FIG. 7 and/or step 1210(*b*) described in FIG. 12. The user computer can decrypt the private key 1310(*b*) with the password, for example, described herein. The user computer 902 encrypts the challenge request 1310(*c*) with the decrypted private key, for example, using encryption techniques known to those of ordinary skill in the art. The user computer outputs 1312 the encrypted challenge request to the online security server 910.

The online security server 910 decrypts 1314(*a*) the encrypted challenge request using the user public key of the user key pair. The decrypted challenge request is compared 1314(*b*) with the original challenge request generated by the online security server at step 1306. If the comparison does not produce a match, then the transaction authorization request is denied. The user can optionally be notified of the denial, for example, by the authorizing issuer. If the comparison is positive, for example, a match, then the method proceeds with establishing a communication with the authorizing issuer 906 with regard to the online transaction.

The online security server 910 encrypts 1314(*c*) user information such as a credit card number, ATM pin number, and the like with an authorizer public key of an authorizer key pair provided by the authorizing party 906. The authorizer public key can include an authorizing party encryption certificate or an SSL certificate. Prior to encrypting the user information, the online security server 910 can request the authorizer public key from the authorizing party, similar to steps 1216 and 1218 shown in FIG. 12. Alternatively, the authorizer public key can be stored in the storage repository 1006 of the online security server 910, and retrieved for the online transaction. In an embodiment, the user information is stored in the storage repository 1006, and can be stored in an encrypted form, for example, using the authorizer public key.

The encrypted user information is output from the online security server 910 to the authorizing party 906, for example, to the verification server 912 of the authorizing party 906. 906. The authorizing party 906 decrypts 1318 the user data using the authorizer private key of the authorizer key pair, and either approves or denies the online transaction. The verification result 1320, the payment token 1322, and the purchase confirmation 1324 can be provided in a manner similar to those described in FIG. 12, and will therefore not be repeated for the sake of brevity.

While the invention has been shown and described with reference to specific embodiments, it should be understood by those skilled in the art that various changes in form and detail may be made therein without departing from the spirit and scope of the invention as recited in the accompanying claims.

What is claimed is:

1. A computer-implemented method for securing an online transaction, comprising:
    generating from an electronic device a request to perform an online transaction;
    generating from an online security server a challenge request in response to the request;
    encrypting the challenge request with a user private key stored in the electronic device;
    outputting the encrypted challenge request to the online security server;
    decrypting the encrypted challenge request from the online security server with a user public key corresponding to the user private key;
    comparing by the online security server the decrypted challenge request and the challenge request generated by the online security server;
    encrypting user information with an authorizer public key in the electronic device in response to the comparison, the user information provided from the electronic device;
    outputting the encrypted user information from the electronic device;
    decrypting the encrypted user information by an authorizing party with an authorizer private key corresponding to the authorizer public key; and
    outputting a result from the authorizing party.

2. The computer-implemented method of claim 1, wherein the authorizer public key includes an SSL certificate.

3. The computer-implemented method of claim 1 further comprising: encrypting the user private key with a password; and storing the encrypted user private key in the electronic device.

4. A computer-implemented method for securing an online transaction, comprising:
    generating from an electronic device a request to perform an online transaction;
    generating from an online security server a challenge request in response to the request;
    encrypting the challenge request with a user private key stored in the electronic device;
    outputting the encrypted challenge request to the online security server;
    decrypting the encrypted challenge request from the online security server with a user public key corresponding to the user private key;
    comparing by the online security server the decrypted challenge request and the challenge request generated by the online security server;
    providing user information from the online security server;
    encrypting the user information with an authorizer public key in the online security server in response to the comparison;
    outputting the encrypted user information from the online security server;
    decrypting the encrypted user information by an authorizing party with an authorizer private key corresponding to the authorizer public key; and
    outputting a result from the authorizing party.

5. A computer-implemented method for securing an online transaction, comprising:
- generating from an electronic device a request to perform an online transaction;
- generating from an online security server a challenge request in response to the request;
- encrypting a user private key with a password; and
- storing the encrypted user private key in the electronic device;
- encrypting the challenge request with the user private key stored in the electronic device;
- outputting the encrypted challenge request to the online security server;
- decrypting the encrypted challenge request from the online security server with a user public key corresponding to the user private key;
- comparing by the online security server the decrypted challenge request and the challenge request generated by the online security server;
- encrypting user information with an authorizer public key in response to the comparison;
- decrypting the encrypted user information by an authorizing party with an authorizer private key corresponding to the authorizer public key; and
- outputting a result from the authorizing party.

6. A computer-implemented method for securing an online transaction, comprising:
- providing from an authorizing party an identification to an electronic device, the identification distinguishing the authorizing party from other authorizing parties with respect to the electronic device;
- outputting the identification to an online security server;
- generating from an electronic device a request to perform an online transaction;
- generating from an online security server a challenge request in response to the request;
- encrypting the challenge request with a user private key stored in the electronic device;
- outputting the encrypted challenge request to the online security server;
- decrypting the encrypted challenge request from the online security server with a user public key corresponding to the user private key;
- comparing by the online security server the decrypted challenge request and the challenge request generated by the online security server;
- sending a request from the online security server to a verification server at the authorizing party for an authorizer public key in response to the identification;
- encrypting user information with the authorizer public key in response to the comparison;
- decrypting the encrypted user information by an authorizing party with an authorizer private key corresponding to the authorizer public key; and
- outputting a result from the authorizing party;
- providing from the authorizing party an identification to the electronic device, the identification distinguishing the authorizing party from other authorizing parties with respect to the electronic device;
- outputting the identification to the online security server; and
- sending a request from the online security server to the verification server for the authorizer public key in response to the identification.

* * * * *